United States Patent
Rengan

(10) Patent No.: US 11,592,328 B2
(45) Date of Patent: Feb. 28, 2023

(54) SYSTEMS AND METHODS FOR DETERMINING SOUND-PRODUCING CHARACTERISTICS OF ELECTROACOUSTIC TRANSDUCERS

(71) Applicant: Lenovo Enterprise Solutions (Singapore) Pte. Ltd., New Tech Park (SG)

(72) Inventor: Marco Rengan, Research Triangle Park, NC (US)

(73) Assignee: Lenovo Enterprise Solutions (Singapore) Pte. Ltd., New Tech Park (SG)

( * ) Notice: Subject to any disclaimer, the term of this patent is extended or adjusted under 35 U.S.C. 154(b) by 308 days.

(21) Appl. No.: 16/836,610

(22) Filed: Mar. 31, 2020

(65) Prior Publication Data
US 2021/0302228 A1    Sep. 30, 2021

(51) Int. Cl.
*H04R 29/00* (2006.01)
*G01H 11/08* (2006.01)
*H04R 1/40* (2006.01)
*H04R 17/00* (2006.01)
*H04R 3/12* (2006.01)

(52) U.S. Cl.
CPC ............. *G01H 11/08* (2013.01); *H04R 1/403* (2013.01); *H04R 3/12* (2013.01); *H04R 17/00* (2013.01); *H04R 29/002* (2013.01)

(58) Field of Classification Search
CPC ...... H04R 29/002; H04R 1/403; H04R 3/005; H04R 3/12
USPC .......................................... 381/56, 77–82, 59
See application file for complete search history.

(56) References Cited

U.S. PATENT DOCUMENTS

| | | | |
|---|---|---|---|
| 8,494,190 B2* | 7/2013 | Sakai | H04S 7/301 |
| | | | 381/59 |
| 9,448,593 B2* | 9/2016 | Kim | H04R 1/028 |
| 10,291,986 B1* | 5/2019 | Plitkins | H04R 5/04 |
| 10,667,070 B2* | 5/2020 | Crutchfield, Jr. | H04R 29/001 |
| 10,681,439 B2* | 6/2020 | Kim | H04R 1/26 |
| 10,986,461 B2* | 4/2021 | Johnson | H04S 7/303 |
| 11,109,173 B2* | 8/2021 | Po | H04S 7/30 |
| 11,153,685 B2* | 10/2021 | Toguri | G10L 25/51 |

* cited by examiner

*Primary Examiner* — Disler Paul
(74) *Attorney, Agent, or Firm* — Olive Law Group, PLLC

(57) ABSTRACT

Systems and methods for determining sound-producing characteristics of electroacoustic transducers are disclosed. According to an aspect, a system includes electroacoustic transducers configured to generate sound. The system also includes an acoustoelectric transducer configured to convert sound produced by the electroacoustic transducers into one or more electrical signals. Further, the system includes a computing device configured to apply one or more patterns of electrical signals to the electroacoustic transducers to test for one or more sound-producing characteristics. The computing device is also configured to receive, from the acoustoelectric transducer, electrical signals that resulted from application of the patterns of electrical signals to the electroacoustic transducers. Further, the computing device is configured to determine, based on the received electrical signals, the sound-producing characteristics of the electroacoustic transducers for use in controlling the electroacoustic transducers to generate one or more predetermined sounds.

18 Claims, 12 Drawing Sheets

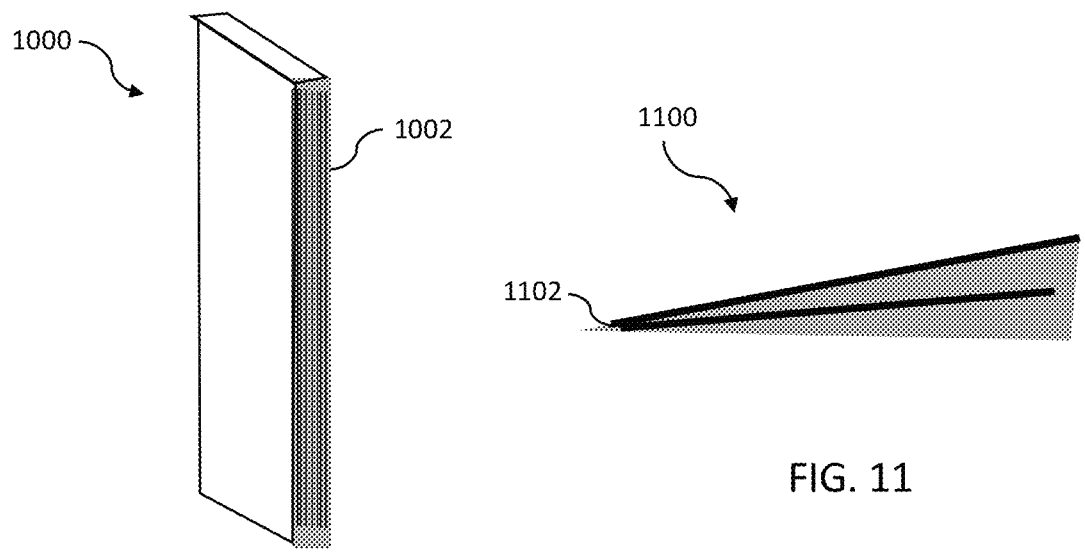
FIG. 10
FIG. 11
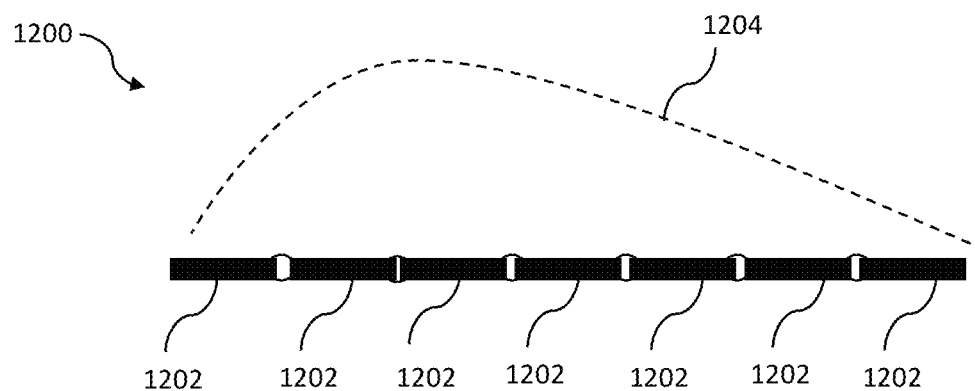
FIG. 12

SYSTEMS AND METHODS FOR DETERMINING SOUND-PRODUCING CHARACTERISTICS OF ELECTROACOUSTIC TRANSDUCERS

TECHNICAL FIELD

The presently disclosed subject matter relates generally to acoustic systems. Particularly, the presently disclosed subject matter relates to systems and methods for determining sound-producing characteristics of electroacoustic transducers.

BACKGROUND

An electroacoustic transducer (also commonly referred to as a "speaker" or a "loudspeaker") is an electronic device that converts an electrical signal into a sound. A common speaker type is the dynamic speaker which includes a coil of wire held in a circular space between poles of a permanent magnet. On application of an alternating current (AC) electrical audio signal to the wire coil, the coil moves rapidly back and forth. Movement of the coil causes a diaphragm attached to the coil to move back and forth and thereby pushes on air to create audible sound waves.

A piezoelectric speaker is a type of speaker that takes advantage of the piezoelectric effect for generating sound. Generally, a piezoelectric speaker operates when a voltage is applied to a piezoelectric material to cause motion of the piezoelectrical material. This motion is converted into an audible sound wave by use of diaphragms and resonators.

Piezoelectric speakers are often used for generating sound in small electronic devices such as smartphones, watches, and portable radios. When used in such small or portable electronic devices, the piezoelectric speaker or other suitable electroacoustic transducer is placed within a housing or other enclosure that is designed to protect it from its environment. For example, the housing is typically designed to protect the speaker from drop impact, moisture, and significant temperature changes. The requirements of these designs can affect the quality of sound produced by these speakers. Also, the design requirements for the housing can vary depending on the particular device with which the speaker is used. Accordingly, there is a need for systems that can adaptively control a speaker to produce high quality sound irrespective of requirements for its housing and even the particular design of the speaker.

BRIEF DESCRIPTION OF THE DRAWINGS

Figure 1:
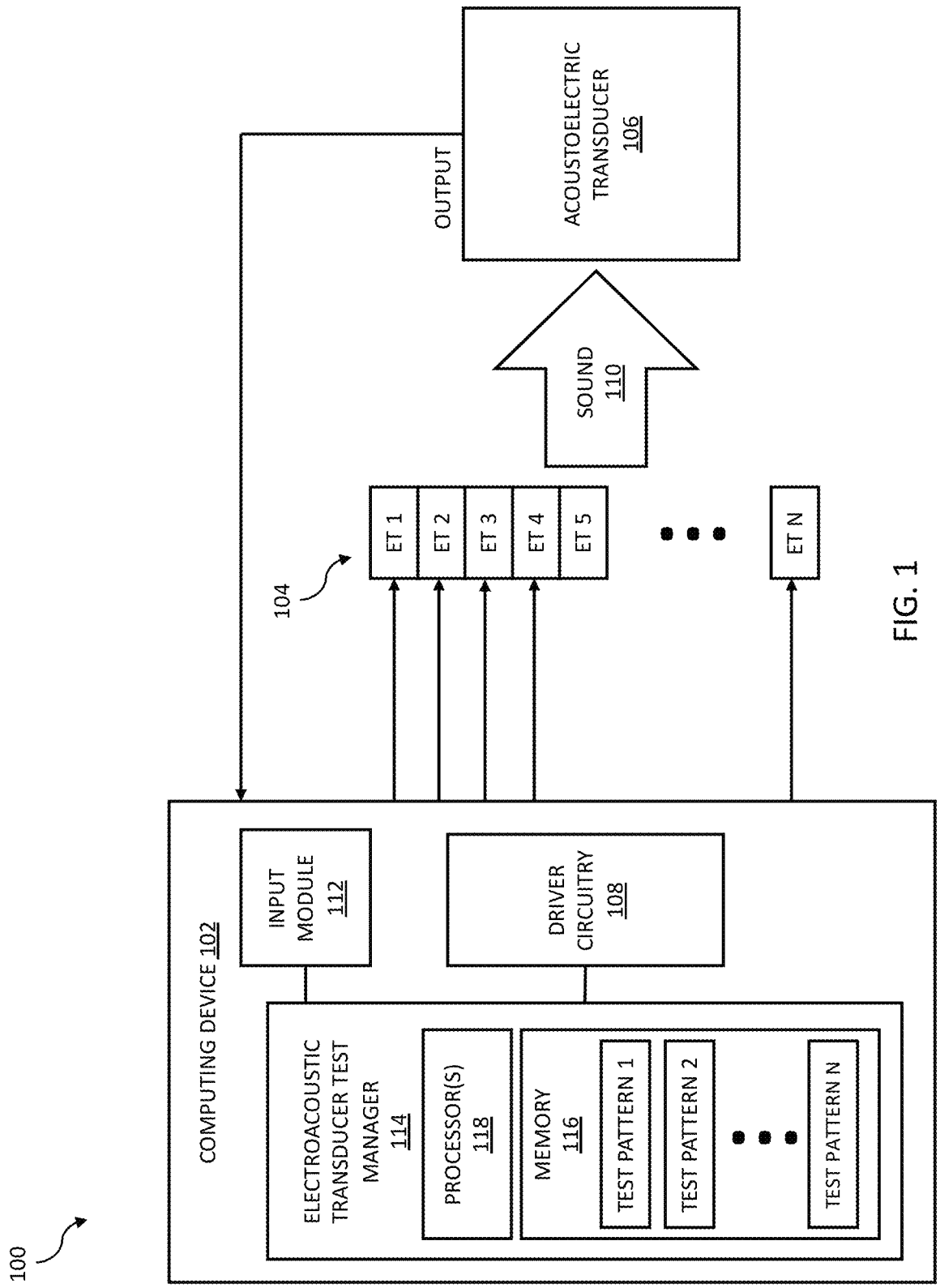
Figure 2:
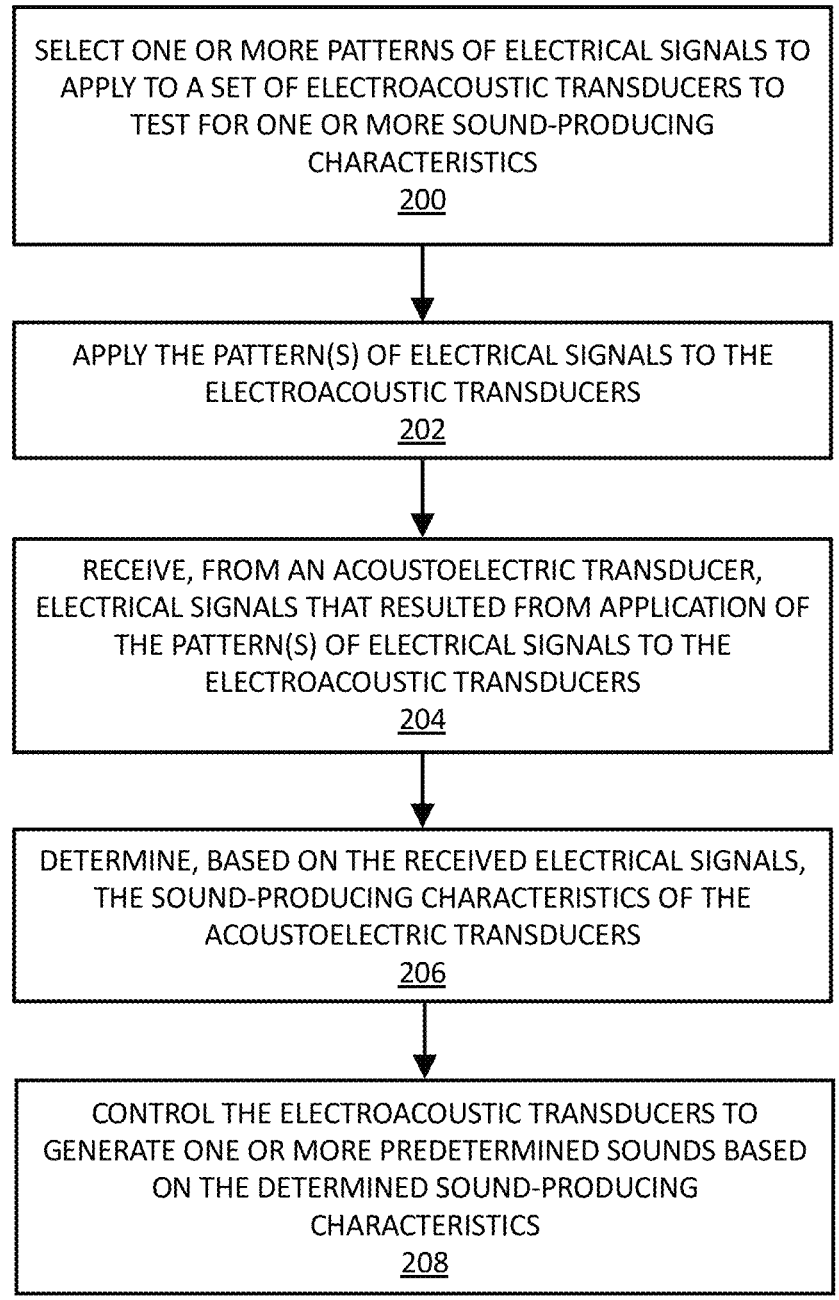
Figure 3:
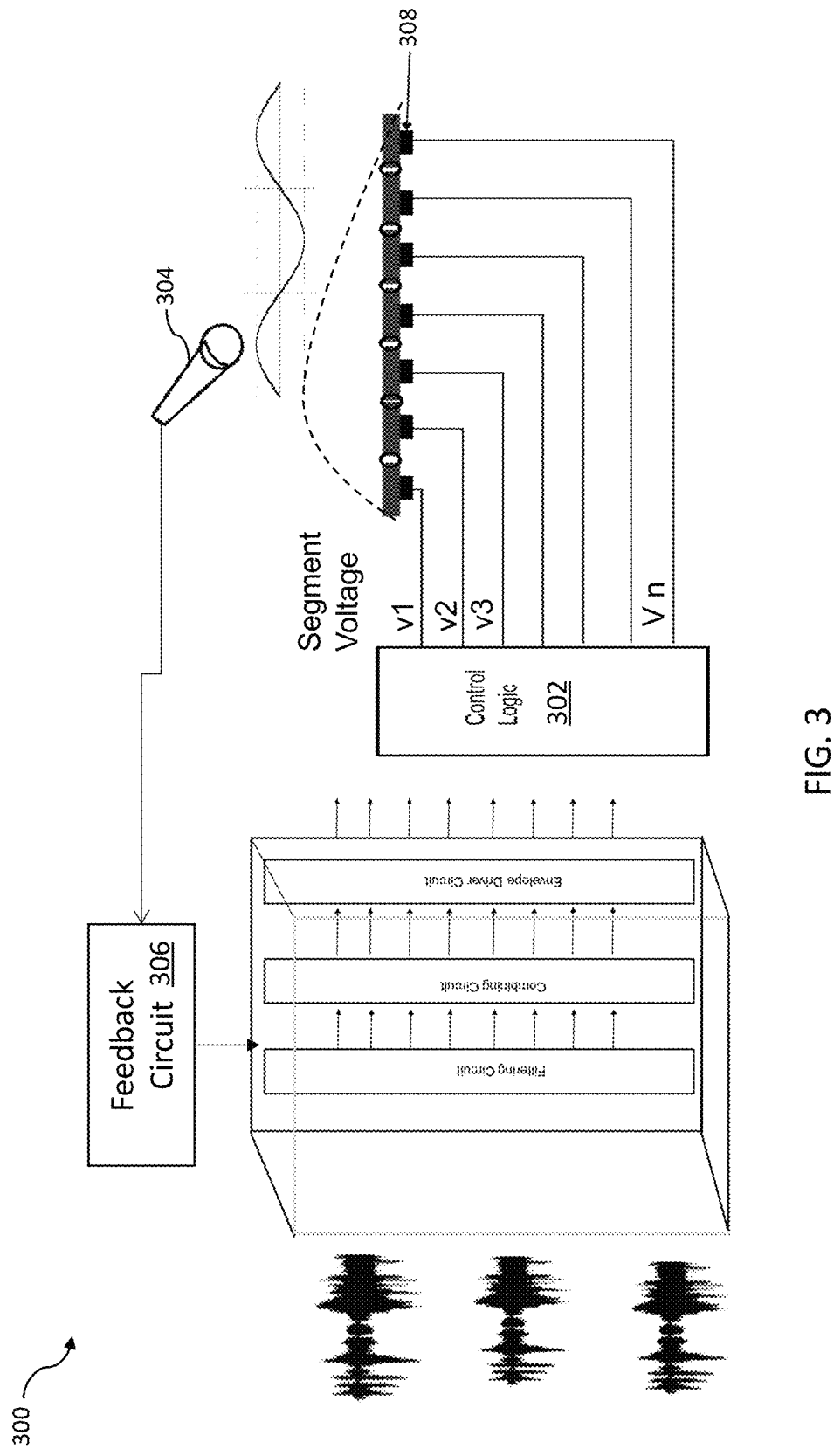
Figure 4:
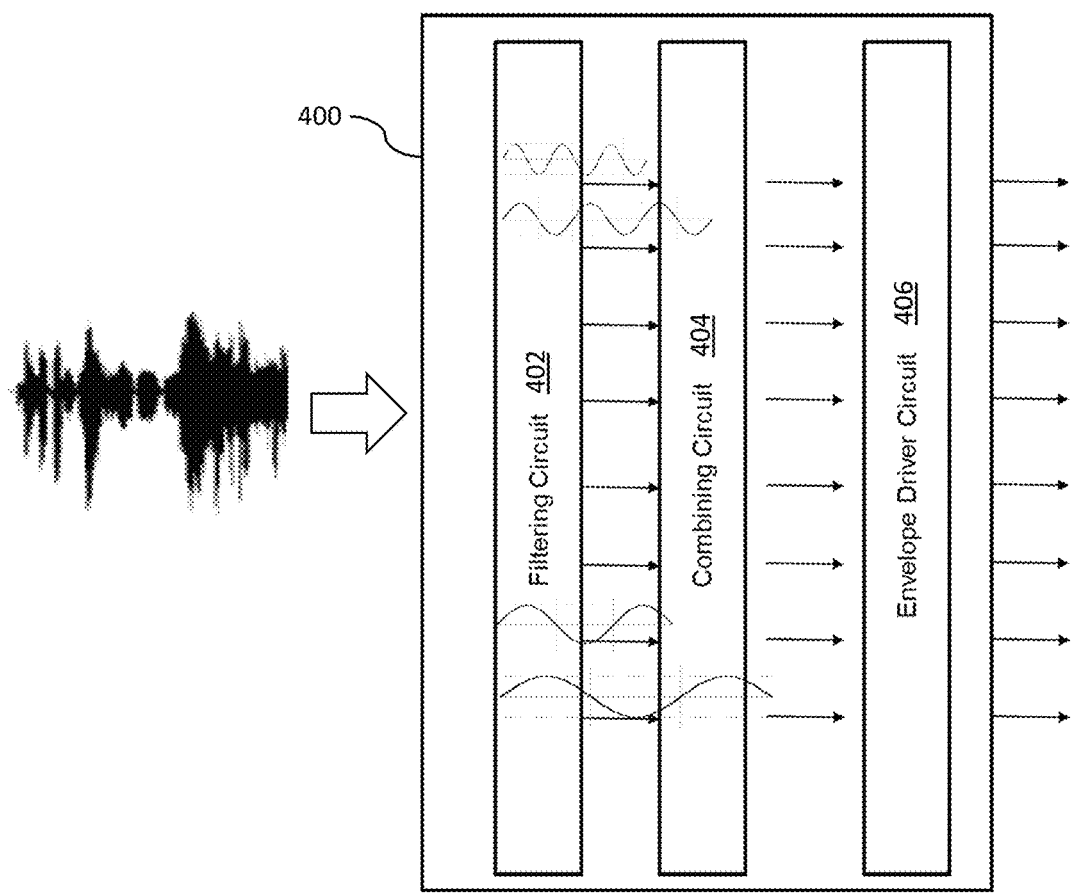
Figure 5:
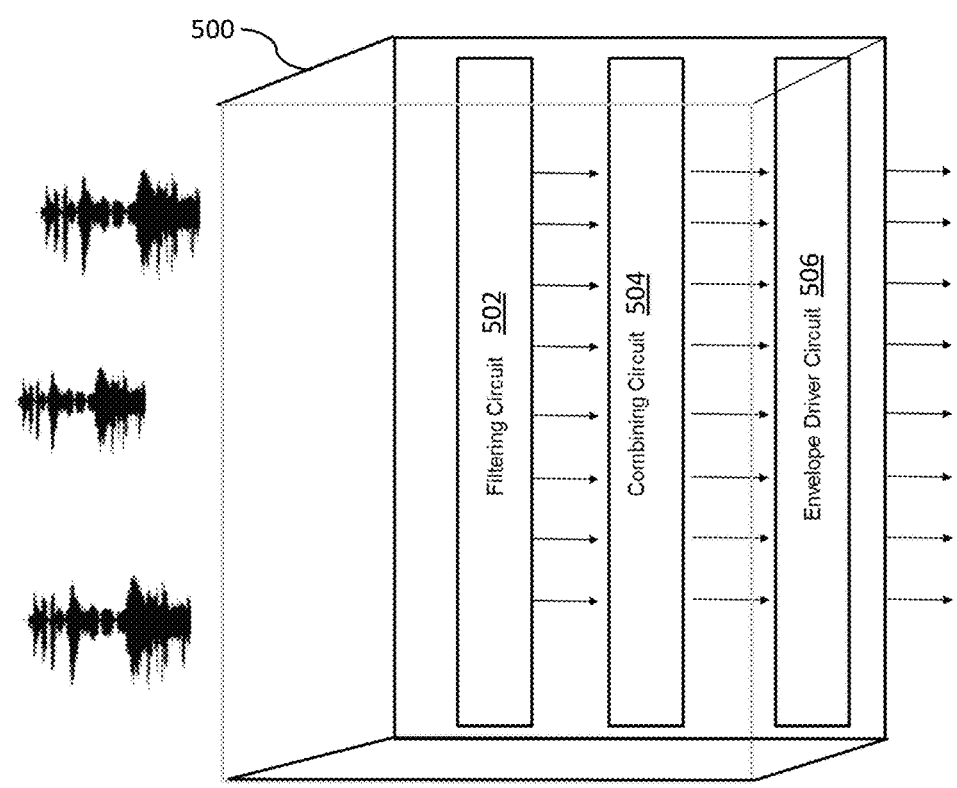
Figure 6:
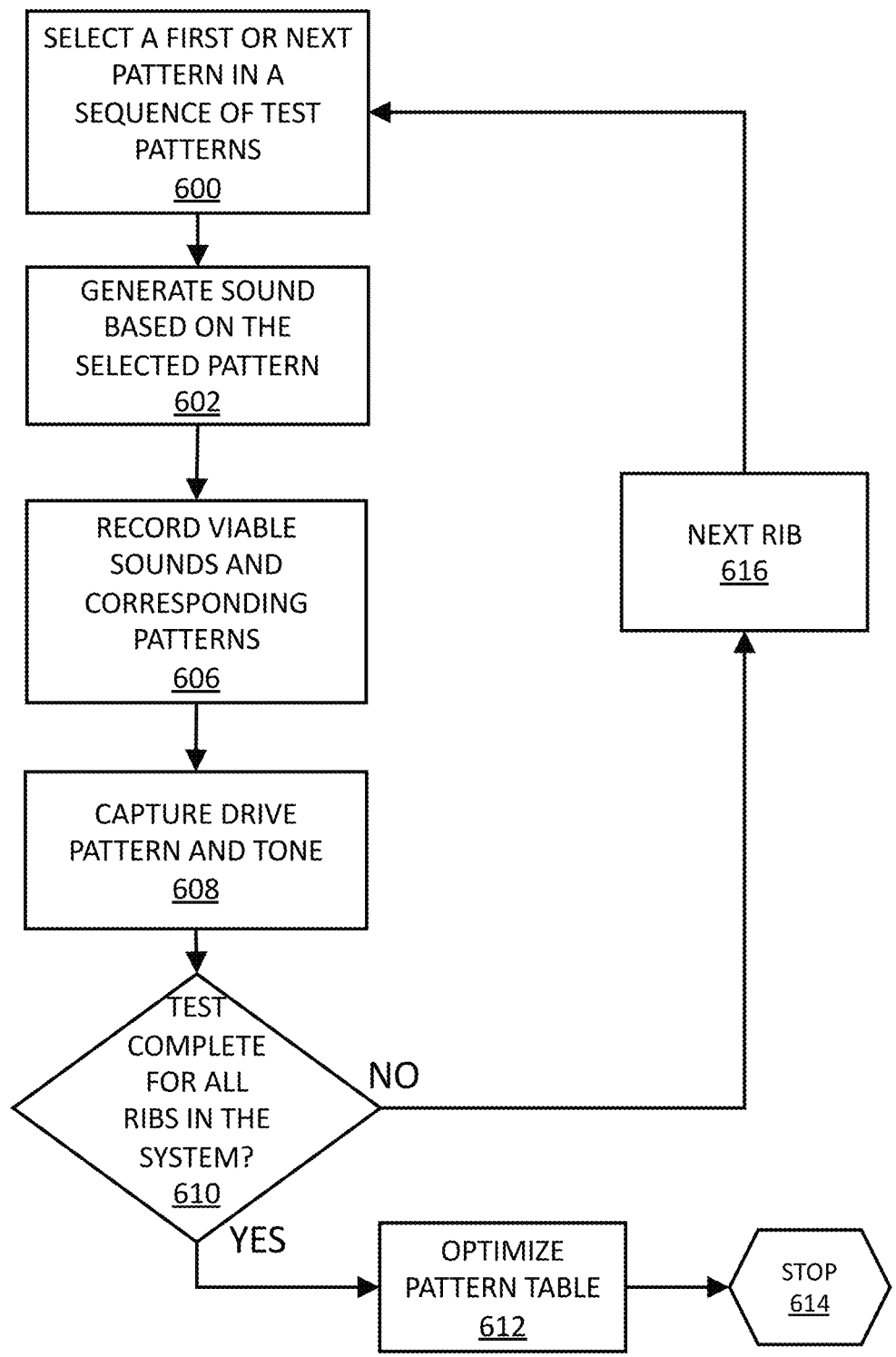
Figure 7:
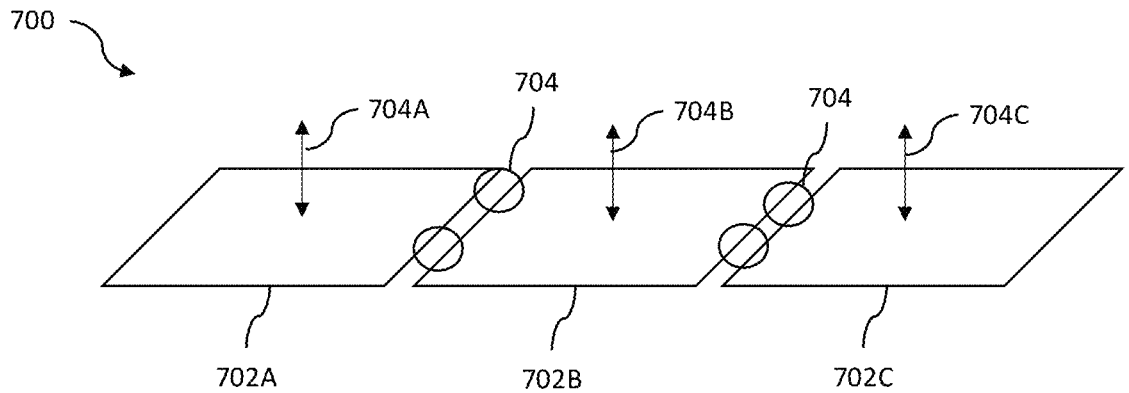
Figure 8:
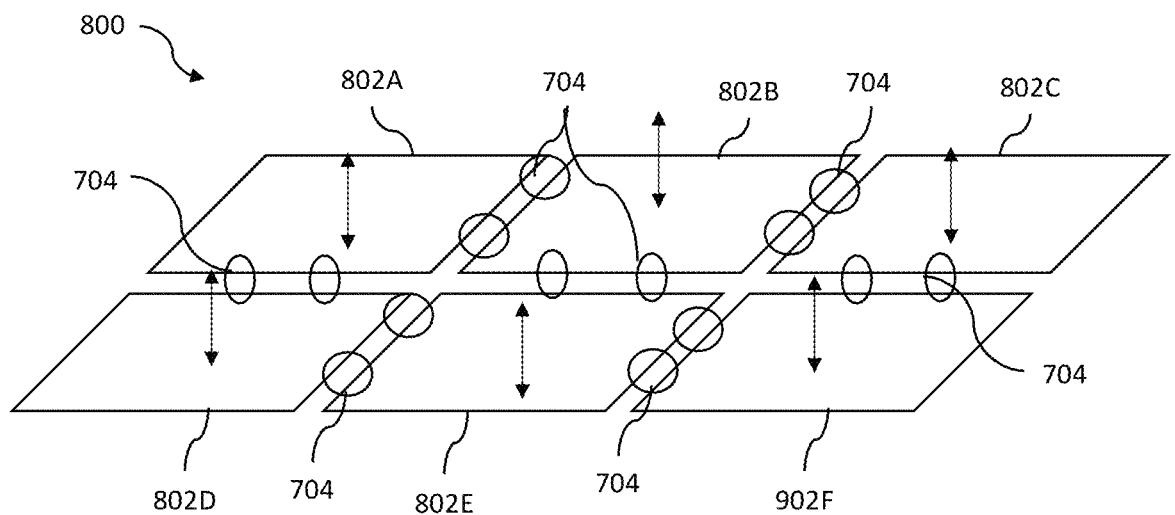
Figure 9:
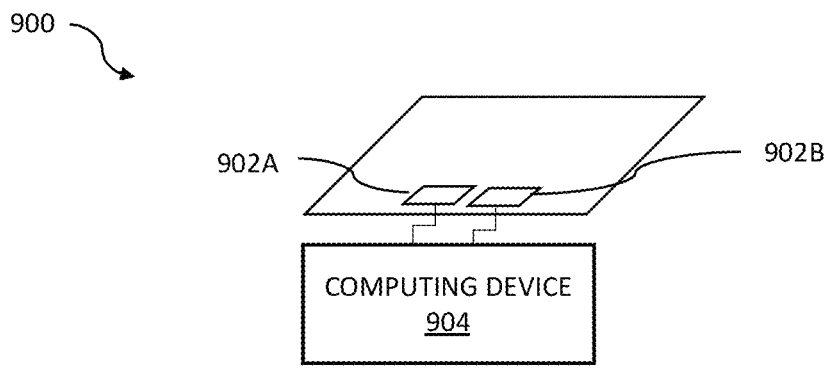
Figure 13:
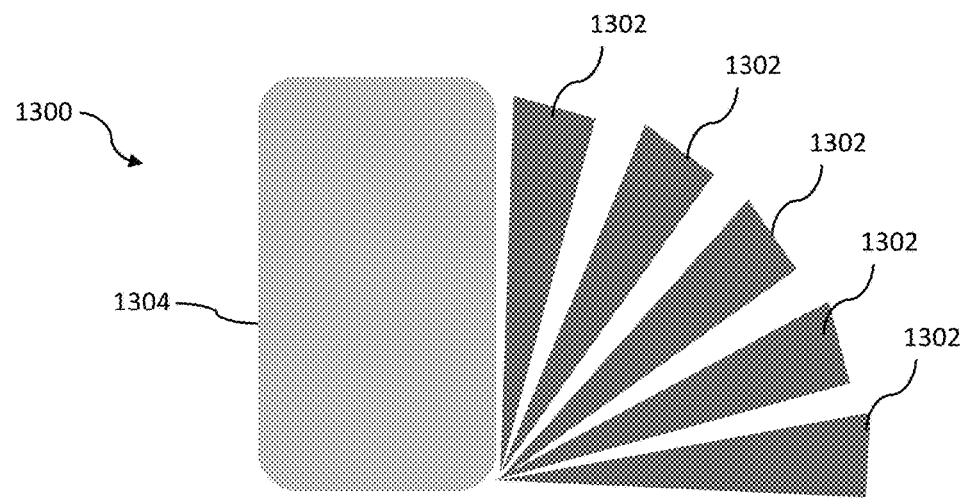
Figure 14:
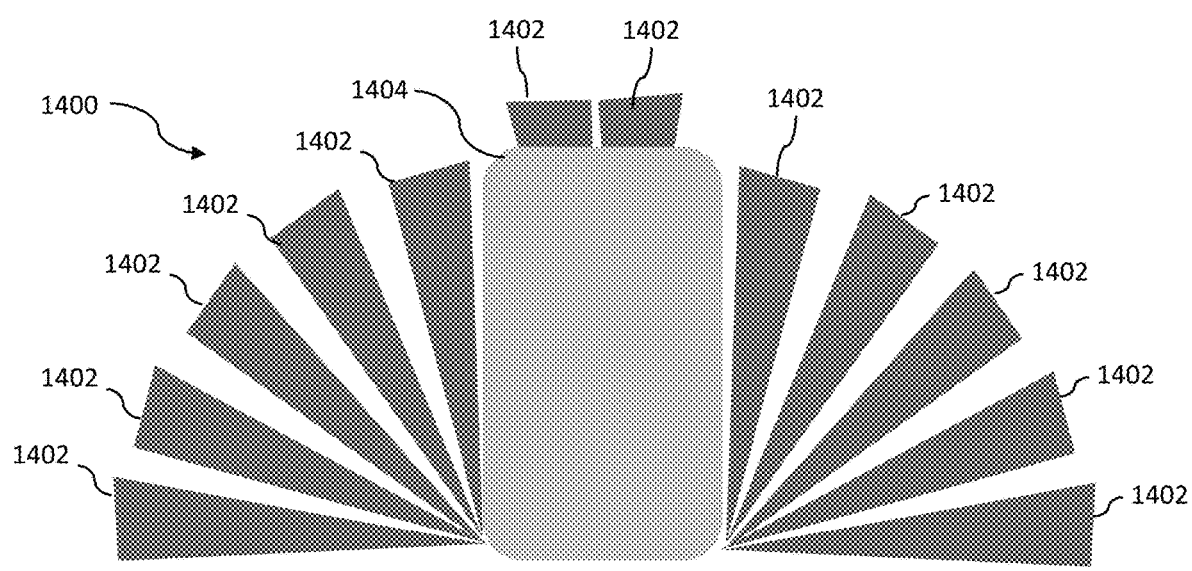
Figure 15:
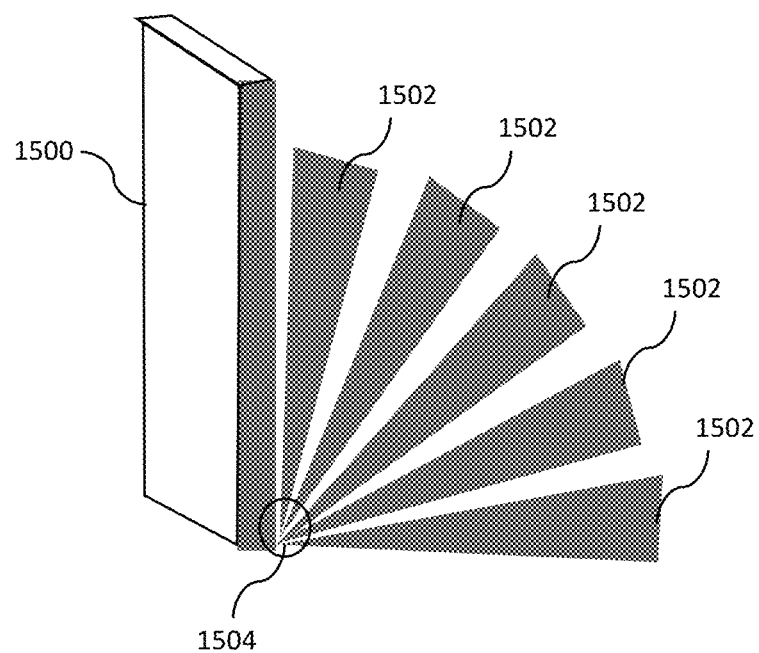
Figure 16:
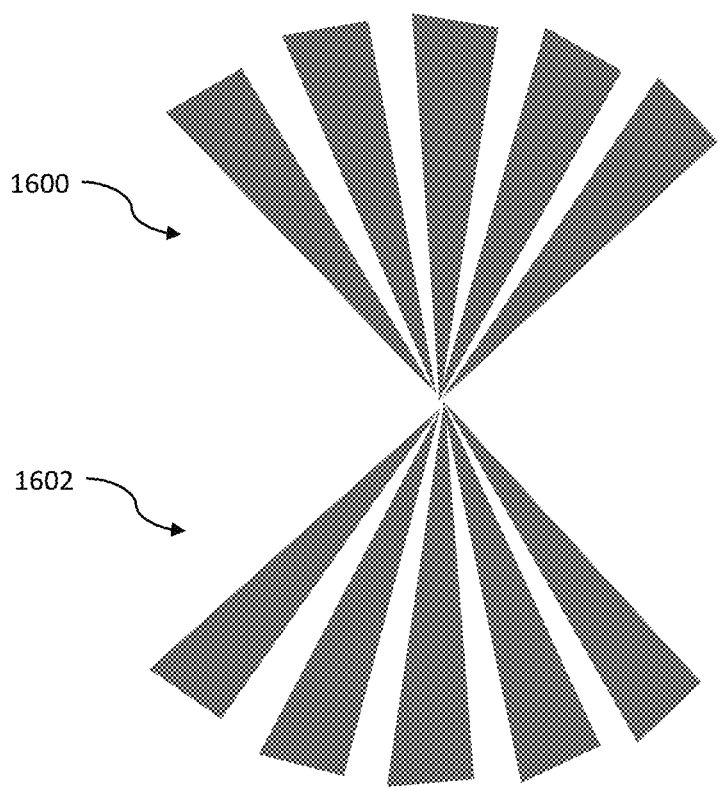
Figure 17:
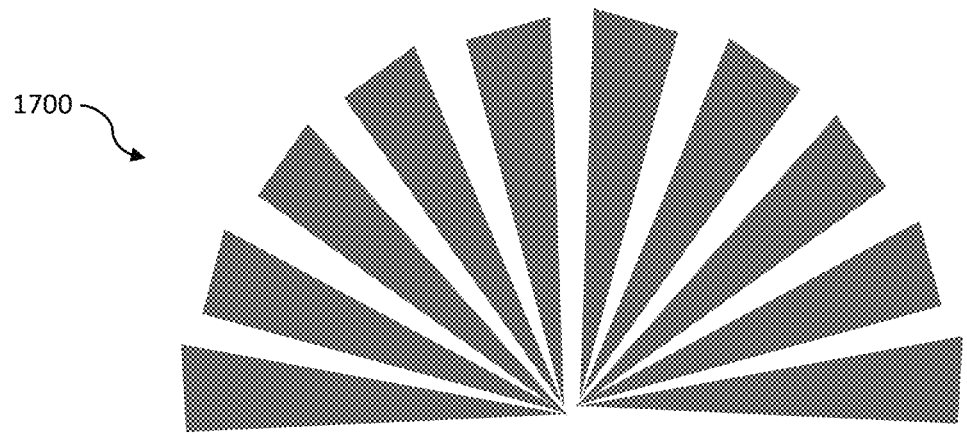
Figure 18:
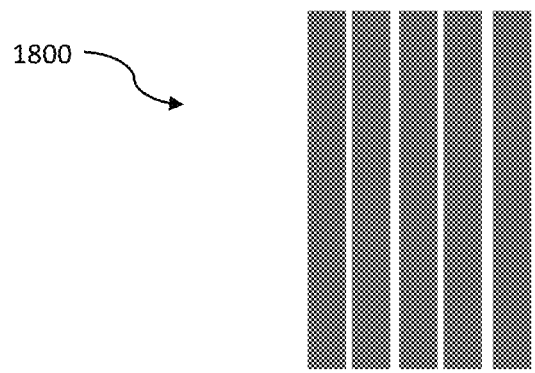
Figure 19:
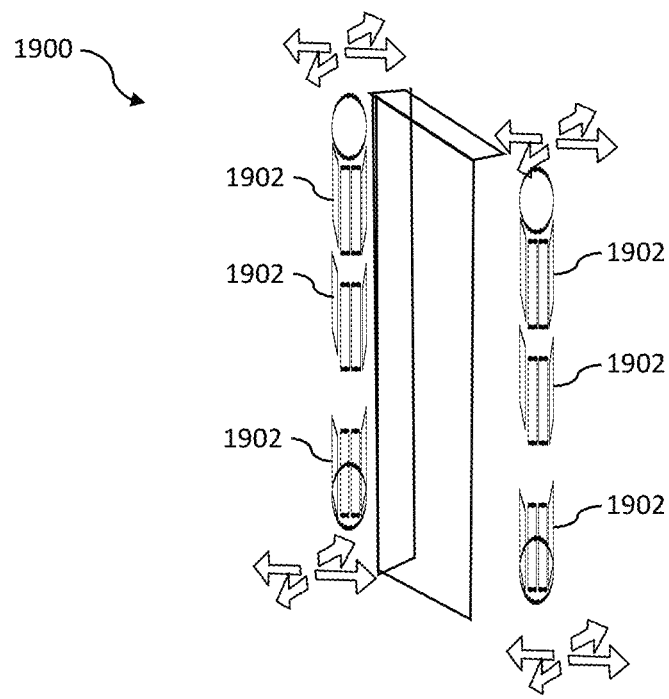
Figure 20:
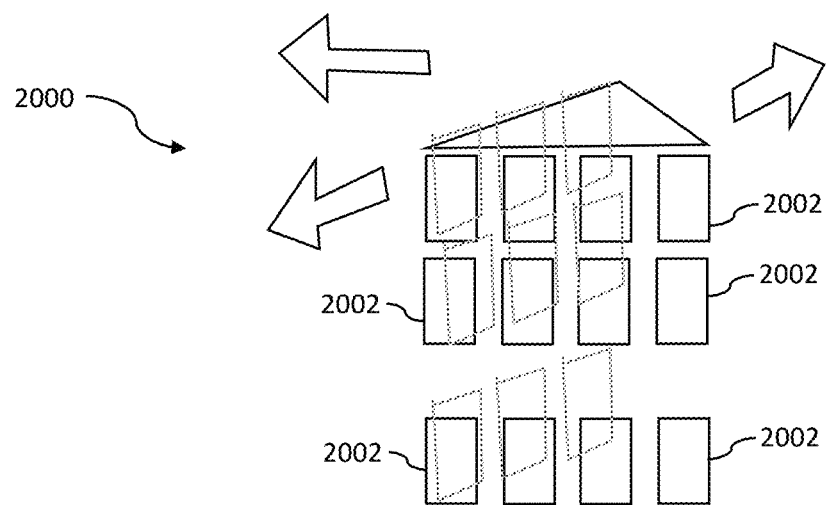
Figure 21:
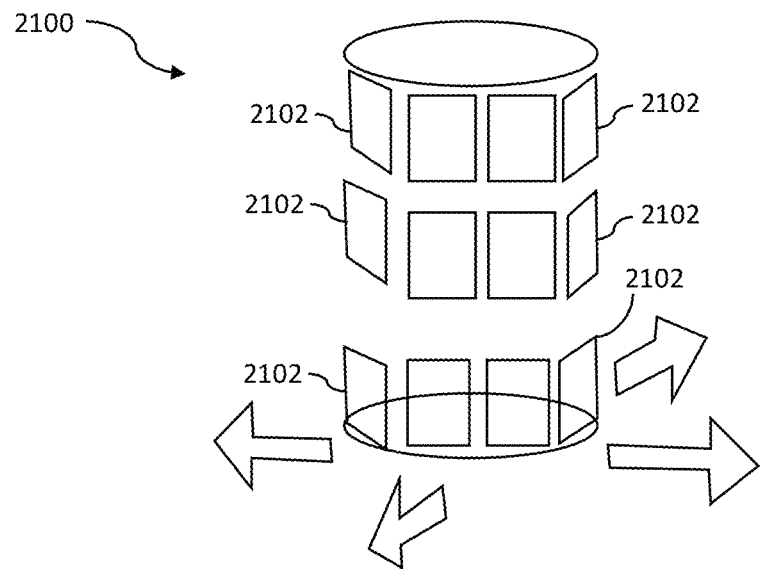
Figure 22:
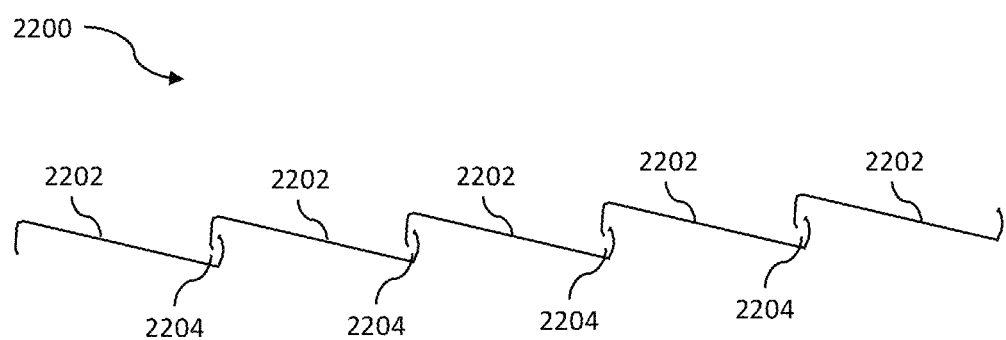

Having thus described the presently disclosed subject matter in general terms, reference will now be made to the accompanying Drawings, which are not necessarily drawn to scale, and wherein:

FIG. 1 is a block diagram of a system for determining sound-producing characteristics of an electroacoustic transducer in accordance with embodiments of the present disclosure;

FIG. 2 is a flow chart of a method for determining sound-producing characteristics of an electroacoustic transducer in accordance with embodiments of the present disclosure;

FIG. 3 is a diagram of another system for sound-producing characteristics of an electroacoustic transducer in accordance with embodiments of the present disclosure;

FIG. 4 is a diagram of a FLASH control circuit that may be part of the control logic shown in FIG. 3 for inputting an electrical signal into a single channel in accordance with embodiments of the present disclosure;

FIG. 5 is a diagram of a FLASH control circuit that may be part of the control logic shown in FIG. 3 for inputting electrical signals into multiple channels in accordance with embodiments of the present disclosure;

FIG. 6 is a flow diagram of a method for learning audio frequency characteristics of electroacoustic transducers in accordance with embodiments of the present disclosure;

FIG. 7 is a perspective view of a system including electroacoustic transducers that are configured to generate sound and to move with respect to each other in response to application of electrical signals in accordance with embodiments of the present disclosure;

FIG. 8 is a perspective view of a system including electroacoustic transducers that are configured to generate sound and to move with respect to each other in response to application of electrical signals in accordance with embodiments of the present disclosure;

FIG. 9 is a perspective view of a system including electroacoustic transducers that are configured to generate sound and to move with respect to each other in response to application of electrical signals in accordance with embodiments of the present disclosure;

FIG. 10 is a perspective view a mobile smartphone with a system of electroacoustic transducers integrated therewith for generating sound in accordance with embodiments disclosed herein;

FIG. 11 is a diagram of an example structure of a piezoelectric segment in accordance with embodiments disclosed herein;

FIG. 12 is a diagram of an array of piezoelectric segments in accordance with embodiments disclosed herein;

FIG. 13 is a diagram of an array of membrane segments in accordance with embodiments of the present disclosure;

FIG. 14 is a diagram of an array of membrane segments in accordance with embodiments of the present disclosure;

FIG. 15 is a diagram of a housing and an array of membrane segments in accordance with embodiments of the present disclosure;

FIG. 16 is a diagram of two fans of membrane segments in accordance with embodiments of the present disclosure;

FIG. 17 illustrates a diagram of a single fan of membrane segments in accordance with embodiments of the present disclosure;

FIG. 18 illustrates a diagram of a row of membrane segments in accordance with embodiments of the present disclosure;

FIG. 19 illustrates a perspective view of a system of multiple electroacoustic transducers arranged for distributing sound in a surrounding area in accordance with embodiments of the present disclosure;

FIG. 20 illustrates a perspective view of another system of multiple electroacoustic transducers arranged for distributing sound in a surrounding area in accordance with embodiments of the present disclosure;

FIG. 21 illustrates a perspective view of another system of multiple electroacoustic transducers arranged for distributing sound in a surrounding area in accordance with embodiments of the present disclosure; and FIG. 22 illustrates a diagram depicting structure for connecting multiple segments together so they are movable with respect to each other in accordance with embodiments of the present disclosure.

SUMMARY

The presently disclosed subject matter relates to systems and methods for determining sound-producing characteristics of electroacoustic transducers. According to an aspect, a system includes electroacoustic transducers configured to generate sound. The system also includes an acoustoelectric transducer configured to convert sound produced by the electroacoustic transducers into one or more electrical signals. Further, the system includes a computing device configured to apply one or more patterns of electrical signals to the electroacoustic transducers to test for one or more sound-producing characteristics. The computing device is also configured to receive, from the acoustoelectric transducer, electrical signals that resulted from application of the patterns of electrical signals to the electroacoustic transducers. Further, the computing device is configured to determine, based on the received electrical signals, the sound-producing characteristics of the electroacoustic transducers for use in controlling the electroacoustic transducers to generate one or more predetermined sounds.

According to another aspect, a method includes applying one or more patterns of electrical signals to electroacoustic transducers to test for one or more sound-producing characteristics. Further, the method includes receiving electrical signals representative of sound produced by the electroacoustic transducers that resulted from application of the patterns of electrical signals to the electroacoustic transducers. The method also includes determining, based on the received electrical signals, the sound-producing characteristics of the electroacoustic transducers for use in controlling the electroacoustic transducers to generate one or more predetermined sounds.

DETAILED DESCRIPTION

The following detailed description is made with reference to the figures. Exemplary embodiments are described to illustrate the disclosure, not to limit its scope, which is defined by the claims. Those of ordinary skill in the art will recognize a number of equivalent variations in the description that follows.

Articles "a" and "an" are used herein to refer to one or to more than one (i.e. at least one) of the grammatical object of the article. By way of example, "an element" means at least one element and can include more than one element.

"About" is used to provide flexibility to a numerical endpoint by providing that a given value may be "slightly above" or "slightly below" the endpoint without affecting the desired result.

The use herein of the terms "including," "comprising," or "having," and variations thereof is meant to encompass the elements listed thereafter and equivalents thereof as well as additional elements. Embodiments recited as "including," "comprising," or "having" certain elements are also contemplated as "consisting essentially of" and "consisting" of those certain elements.

Recitation of ranges of values herein are merely intended to serve as a shorthand method of referring individually to each separate value falling within the range, unless otherwise indicated herein, and each separate value is incorporated into the specification as if it were individually recited herein. For example, if a range is stated as between 1%-50%, it is intended that values such as between 2%-40%, 10%-30%, or 1%-3%, etc. are expressly enumerated in this specification. These are only examples of what is specifically intended, and all possible combinations of numerical values between and including the lowest value and the highest value enumerated are to be considered to be expressly stated in this disclosure.

Unless otherwise defined, all technical terms used herein have the same meaning as commonly understood by one of ordinary skill in the art to which this disclosure belongs.

Functional units described in this specification have been labeled as computing devices. A computing device may be implemented in programmable hardware devices such as processors, digital signal processors, central processing units, field programmable gate arrays, programmable array logic, programmable logic devices, cloud processing systems, or the like. The computing devices may also be implemented in software for execution by various types of processors. An identified device may include executable code and may, for instance, comprise one or more physical or logical blocks of computer instructions, which may, for instance, be organized as an object, procedure, function, or other construct. Nevertheless, the executable of an identified device need not be physically located together but may comprise disparate instructions stored in different locations which, when joined logically together, comprise the computing device and achieve the stated purpose of the computing device. In another example, a computing device may be a server or other computer located within a retail environment and communicatively connected to other computing devices (e.g., POS equipment or computers) for managing accounting, purchase transactions, and other processes within the retail environment. In another example, a computing device may be a mobile computing device such as, for example, but not limited to, a smart phone, a cell phone, a pager, a personal digital assistant (PDA), a mobile computer with a smart phone client, or the like. In another example, a computing device may be any type of wearable computer, such as a computer with a head-mounted display (HMD), or a smart watch or some other wearable smart device. Some of the computer sensing may be part of the fabric of the clothes the user is wearing. A computing device can also include any type of conventional computer, for example, a laptop computer or a tablet computer. A typical mobile computing device is a wireless data access-enabled device (e.g., an iPHONE® smart phone, a BLACKBERRY® smart phone, a NEXUS ONE™ smart phone, an iPAD® device, smart watch, or the like) that is capable of sending and receiving data in a wireless manner using protocols like the Internet Protocol, or IP, and the wireless application protocol, or WAP. This allows users to access information via wireless devices, such as smart watches, smart phones, mobile phones, pagers, two-way radios, communicators, and the like. Wireless data access is supported by many wireless networks, including, but not limited to, Bluetooth, Near Field Communication, CDPD, CDMA, GSM, PDC, PHS, TDMA, FLEX, ReFLEX, iDEN, TETRA, DECT, DataTAC, Mobitex, EDGE and other 2G, 3G, 4G, 5G, and LTE technologies, and it operates with many handheld device operating systems, such as PalmOS, EPOC, Windows CE, FLEXOS, OS/9, JavaOS, iOS and Android. Typically, these devices use graphical displays and can access the Internet (or other communications network) on so-called mini- or micro-browsers, which are web browsers with small file sizes that can accommodate the reduced memory constraints of wireless networks. In a representative embodiment, the mobile device is a cellular telephone or smart phone or smart watch that operates over GPRS (General Packet Radio Services), which is a data technology for GSM networks or operates over Near Field Communication e.g. Bluetooth. In addition to a conventional voice communication, a given mobile device can communicate with another such device via many different types of message transfer techniques, including Bluetooth, Near Field Communication, SMS (short message service), enhanced SMS (EMS), multi-media message (MMS), email WAP, paging, or other known or later-developed wireless data formats. Although many of the examples provided herein are implemented on smart phones, the examples may similarly be implemented on any suitable computing device, such as a computer.

An executable code of a computing device may be a single instruction, or many instructions, and may even be distributed over several different code segments, among different applications, and across several memory devices. Similarly, operational data may be identified and illustrated herein within the computing device, and may be embodied in any suitable form and organized within any suitable type of data structure. The operational data may be collected as a single data set, or may be distributed over different locations including over different storage devices, and may exist, at least partially, as electronic signals on a system or network.

The described features, structures, or characteristics may be combined in any suitable manner in one or more embodiments. In the following description, numerous specific details are provided, to provide a thorough understanding of embodiments of the disclosed subject matter. One skilled in the relevant art will recognize, however, that the disclosed subject matter can be practiced without one or more of the specific details, or with other methods, components, materials, etc. In other instances, well-known structures, materials, or operations are not shown or described in detail to avoid obscuring aspects of the disclosed subject matter.

As used herein, the term "memory" is generally a storage device of a computing device. Examples include, but are not limited to, read-only memory (ROM) and random access memory (RAM).

The device or system for performing one or more operations on a memory of a computing device may be a software, hardware, firmware, or combination of these. The device or the system is further intended to include or otherwise cover all software or computer programs capable of performing the various heretofore-disclosed determinations, calculations, or the like for the disclosed purposes. For example, exemplary embodiments are intended to cover all software or computer programs capable of enabling processors to implement the disclosed processes. Exemplary embodiments are also intended to cover any and all currently known, related art or later developed non-transitory recording or storage mediums (such as a CD-ROM, DVD-ROM, hard drive, RAM, ROM, floppy disc, magnetic tape cassette, etc.) that record or store such software or computer programs. Exemplary embodiments are further intended to cover such software, computer programs, systems and/or processes provided through any other currently known, related art, or later developed medium (such as transitory mediums, carrier waves, etc.), usable for implementing the exemplary operations disclosed below.

In accordance with the exemplary embodiments, the disclosed computer programs can be executed in many exemplary ways, such as an application that is resident in the memory of a device or as a hosted application that is being executed on a server and communicating with the device application or browser via a number of standard protocols, such as TCP/IP, HTTP, XML, SOAP, REST, JSON and other sufficient protocols. The disclosed computer programs can be written in exemplary programming languages that execute from memory on the device or from a hosted server, such as BASIC, COBOL, C, C++, Java, Pascal, or scripting languages such as JavaScript, Python, Ruby, PHP, Perl, or other suitable programming languages.

As referred to herein, the terms "computing device" and "entities" should be broadly construed and should be understood to be interchangeable. They may include any type of computing device, for example, a server, a desktop computer, a laptop computer, a smart phone, a cell phone, a pager, a personal digital assistant (PDA, e.g., with GPRS NIC), a mobile computer with a smartphone client, or the like.

As used herein, the term "electroacoustic transducer" should be broadly construed and refers to a device operable or configured to generate sound in response to input of a suitable electrical signal. A suitable electrical signal input into the electroacoustic transducer for generating audible sound (or soundwaves) may be referred to as an electrical audio signal. For example, the electrical audio signal may be considered an electrical representation of sound, and may include different levels of electrical voltage for analog signals, or a series of binary numbers for digital signals. The electrical signal may have a frequency between about 20 to 20,000 Hz. The electroacoustic transducer may convert the electrical audio signal into sound or soundwaves. Example electroacoustic transducers include, but are not limited to, loudspeakers and earphones. In other examples, electroacoustic transducers may be applied to guitar amp speakers and large diaphragm speakers. Further, for example, electroacoustic transducers disclosed herein may be used with phones and hearing aids.

An example speaker is a piezoelectric speaker that is a speaker that uses the piezoelectric effect for generating sound or soundwave. During option, a voltage is applied to a piezoelectric material of the piezoelectric speaker to cause mechanical motion. This mechanical motion is converted to sound or soundwaves using diaphragms and resonators.

As used herein, the term "acoustoelectric transducer" should be broadly construed and refers to a device operable or configured to generate an electrical signal in response to input of sound or a soundwave. The electrical signal may be representative of the input sound or soundwave. A microphone or dynamic microphone is an example acoustoelectric transducer that can convert audible sound into an electrical audio signal. Other example microphones include, but are not limited to, a condenser microphone and a piezoelectric microphone.

FIG. 1 illustrates a block diagram of a system 100 for determining sound-producing characteristics of an electroacoustic transducer in accordance with embodiments of the present disclosure. Referring to FIG. 1, the system 100 includes a computing device 102, multiple electroacoustic transducers (ET 1-ET represent individual electroacoustic transducers, and "N" indicates that there is an N number of electroacoustic transducers) 104, and an acoustoelectric transducer 106. The computing device 102 includes driver circuitry 108 that is operably connected to the electroacoustic transducers 104. The driver circuitry 108 can apply electrical audio signals to the electroacoustic transducers 104 such that one or more of the electroacoustic transducers 104 emit audible sound 110, which is represented by an arrow. The driver circuitry 108 may include any suitable hardware, software, firmware, or combinations thereof operable to receive input instructions, data, or information for outputting electrical signals to control the electroacoustic transducers 104 to emit sound 110. As an example, the driver circuitry 108 may include transistor-transistor logic (TTL) circuitry or the like for driving the electroacoustic transducers 104.

The acoustoelectric transducer 106 may receive sound 110 emitted by the electroacoustic transducer(s) 104 as input. In response to receipt of the sound 110, the acoustoelectric transducer 106 can generate and output electrical signals representative of the received sound 110. The acoustoelectric transducer 106 may be operatively connected to the computing device 102 for transmission of the output electrical signals to the computing device 102. For example, the computing device 102 may include an input module 112 configured to receive the electrical signals from the acoustoelectric transducer 106 and to convert the electrical signals to data representative of the sound for storage in memory of the computing device 102.

In accordance with embodiments, the computing device 102 includes an electroacoustic transducer test manager 114 configured to apply one or more patterns of electrical signals to electroacoustic transducers to test for one or more sound-producing characteristics; to receive, from an acoustoelectric transducer, electrical signals that resulted from application of the pattern(s) of electrical signals to the electroacoustic transducers; and to determine, based on the received electrical signals, the sound-producing characteristics of the electroacoustic transducers for use in controlling the electroacoustic transducers to generate one or more predetermined sounds. The manager 114 may include hardware, software, firmware, or combinations thereof for implementing these functions and others disclosed herein. For example, the manager 114 may include memory 116 and one or more processors 118 configured to implement these functions and others disclosed herein.

FIG. 2 illustrates a flow chart of a method for determining sound-producing characteristics of an electroacoustic transducer in accordance with embodiments of the present disclosure. The method is described by example as being implemented by the system 100 shown in FIG. 1, although it should be understood that the method may alternatively be implemented by another suitable system.

Referring to FIG. 2, the method includes selecting 200 one or more patterns of electrical signal to apply to a set of electroacoustic transducers to test for one or more sound-producing characteristics. For example, memory 116 may store multiple test patterns 1-N, where "N" indicates that there is an N number of test patterns. A test pattern may be a specification for electrical signal input into the set of electroacoustic transducers for testing for one or more sound-producing characteristics of the set of electroacoustic transducers. Example sound-producing characteristics include, but are not limited to, an audio frequency characteristic, an audio amplitude characteristic, and the like. The manager 114 may select one or more of the patterns for testing on the electroacoustic transducers, such as electroacoustic transducers 104.

In an example scenario, an entire set of patterns may be run in a first pass, and the tones they generate may be collected. Once a table has been populated, it can be determined that some sets of patterns produce the exact same tone while other patterns produce no tones at all. An optimization cycle may subsequently eliminate the null generating patterns as well as those patterns that are complex versus simple patterns that produce the same result.

Returning to FIG. 2, the method includes applying 202 one or more patterns of electrical signals to electroacoustic transducers to test for one or more sound-producing characteristics. Continuing the aforementioned example, the manager 114 may retrieve the selected test patterns from memory 116, and input the selected test patterns into the driver circuitry 108. The driver circuitry 108 may convert the received test patterns to electrical signals that are output to the electroacoustic transducers 104. As an example, a test pattern may specify an electrical input (e.g., predefined voltage) or no electrical input (e.g., no voltage) to be applied to each electroacoustic transducer ET 1-ET N 104. The test patterns may be retrieved and input into the driver circuitry 108, which may be controlled by the test patterns to input a predetermined sequence of electrical signals into the electroacoustic transducers 104.

Table 1 below shows an example initial set of patterns that can be applied in sequence for testing the sound-producing characteristics of electroacoustic transducers 104. The test patterns may be stored in memory 116, for example.

TABLE 1

Initial Set of Test Patterns and Sound-Producing Characteristic Data Prior to Testing

| Test Pattern | Frequency Response |
| --- | --- |
| 0000000000 | 0000 |
| 0000000001 | 0000 |
| 0000000010 | 0000 |
| 0000000011 | 0000 |
| 0000000100 | 0000 |
| 1111111111 | 0000 |

Each test pattern may be associated with data corresponding to a response of the electroacoustic transducers 104 when the test pattern is applied. In this example, there are 10 electroacoustic transducers, and there are 10 digits that each correspond to a different input to an electroacoustic transducer. Particularly, each digit may be a "0" or "1" to indicate either application of no electrical signal (i.e., "0"), or application of a predefined voltage (i.e., "1") to the corresponding electroacoustic transducer. Thereby, a single test pattern indicates application of a predefined voltage or not for each electroacoustic transducer. The test pattern may be input into the driver circuitry 108, which is configured to apply either no electrical signal or the predefined voltage to the electroacoustic transducers 104 in accordance with the test pattern. It is noted that the test patterns of Table 1 may be run in sequence beginning at the first row with "0000000000" to the second row with "1111111111" for applying every combination of no electrical signal and the predefined voltage to the electroacoustic transducers 104.

Further regarding the example of Table 1, the data stored for each test pattern is "0000" to indicate that a test has not yet been run on the electroacoustic transducers 104 for that corresponding pattern. In this table, the sound-producing characteristic tested and the response stored is the frequency of the sound emitted by the electroacoustic transducers 104 in response to the applied test pattern. It is noted that in addition to or alternative to frequency, the table may also store amplitudes (e.g., in decibels (dB)) of the response to test patterns.

The method of FIG. 2 includes receiving 204, from an acoustoelectric transducer, electrical signals that resulted from application of the pattern(s) of electrical signals to the electroacoustic transducers. Continuing the aforementioned example, the electroacoustic transducers 104 can emit different sounds 110 in response to the different predetermined sequence of electrical signals input into the electroacoustic transducers 104. The acoustoelectric transducer 106 may in turn receive the sounds 110 and output electrical signals representative of the sounds 110. The input module 112 may receive the electrical signals output by the acoustoelectric transducer 106. The received electrical signals may be indicative of the frequency response and/or amplitude response of the acoustoelectric transducer 106 to input of the test patterns.

The method of FIG. 2 includes determining 206, based on the received electrical signals, the sound-producing characteristics of the electroacoustic transducers. Continuing the aforementioned example, the electrical signals received from the acoustoelectric transducer 106 may carry information indicating the frequency response and/or amplitude response of the acoustoelectric transducer 106 to input of the test patterns. The input module 112 and/or the manager 114 may encode the frequency response and/or amplitude response information into data and store the encoded information at memory 116. Further, the manager 114 may map the encoded information in memory 116 to the test patterns that resulted in the corresponding frequency response and/or amplitude response. For example, a test pattern in memory 116 that resulted in a particular frequency response and/or amplitude response may be mapped to the corresponding encoded information for the frequency response and/or amplitude response.

Continuing the example associated with Table 1, Table 2 below shows the test patterns from Table 1 and the corresponding encoded frequency response for each test pattern. For example, in response to running test pattern "0000000000" on electroacoustic transducers 104, an electrical signal indicating a frequency response was received at the input module 112 and encoded and stored as "aaaa" to represent the frequency response in hertz. In this way, the manager 114 has applied to test pattern to learn and record the frequency response for subsequent use to control the acoustofluidic transducers to generate a sound with the same frequency by applying the corresponding test pattern. It is noted that "NULL" indicates that there was not an adequate response by the acoustofluidic transducers 104 when the corresponding test pattern was applied.

TABLE 2

Set of Test Patterns and Sound-Producing Characteristic Data Subsequent to Testing

| Test Pattern | Frequency Response (Hz) |
|---|---|
| 0000000000 | aaaa |
| 0000000001 | NULL |
| 0000000010 | NULL |
| 0000000011 | aa1 |
| 0000000100 | ba1 |
| 1111111111 | gg2 |

The method of FIG. 2 includes controlling 208 the electroacoustic transducers to generate one or more predetermined sounds based on the determined sound-producing characteristics. Continuing the aforementioned example, the computing device 102 may control the electroacoustic transducers 104 to emit one or more predetermined sounds. For example, the predetermined sounds may be represented by audio data in a suitable format stored in memory, such as memory 116. The manager 114 may determine frequencies and/or amplitudes of the sounds represented by the audio data, and correlate these to the frequencies and/or amplitudes produced by the electroacoustic transducers 104 and corresponding to test patterns. The computing device 102 may use the mapping of frequency responses to test patterns to input the test patterns for the electroacoustic transducers 104 to emit sound having the desired frequencies. For example, to cause the electroacoustic transducers 104 to emit sounds the same or similar to the predetermined sounds, the manager 114 may determine the sequence, timing, and frequencies of the predetermined sounds, and use the mapping to input test patterns according to the sequence, timing, and frequencies to input appropriate test patterns into the driver circuitry 108 for controlling the electroacoustic transducers 104. Thereby, the electroacoustic transducers 104 can be controlled to generate the predetermined sounds based on the determined sound-producing characteristics of the electroacoustic transducers 104. It is noted that the electroacoustic transducers 104 may be used to create a built in parametric equalizer where certain frequencies, or frequency ranges are amplified above others. Further, the electroacoustic transducers 104 may be used to simulate tonal characteristics of certain structure in human and animal physiology based on the bone and facial structures.

FIG. 3 illustrates a diagram of another system 300 for sound-producing characteristics of an electroacoustic transducer in accordance with embodiments of the present disclosure. Referring to FIG. 3, the system 300 includes control logic 302, an audio capture system 304, a feedback circuit 306, and an array of piezoelectric strips 308. The control logic 302 may include circuitry with outputs operatively connected to piezoelectric strips 308 for individually inputting electrical signals into the piezoelectric strips 208 to thereby cause the piezoelectric strips to generate sound. In accordance with embodiments, the control logic 302 may apply voltages (i.e., volts v1-vn) to the piezoelectric strips 208 in accordance with a test pattern. The audio capture system 304 may be an acoustoelectric transducer, such as a microphone, configured to detect the sounds generated by the piezoelectric strips 208 in response to the test pattern, and to output an electrical signal representative of the detected sound. The feedback circuit 306 may receive the output electrical signal. Further, the feedback circuit 306 can identify discrete frequencies within a planned operating range. This may be tuned to be within a specified % spacing from the adjacent frequency. The feedback circuit 306 may identify the signal frequency, assign it a value, and tie it to a generating pattern. In addition, the feedback circuit 306 can detect the amplitude and assign a dB value to the generated frequency. This signal may be used as a step in the marching pattern. For example, if frequency detected is in a number n Hz then the next step can be n+x Hz, where x would a small increment value. At a high level, the first stage of detection may be a precise filter which can detect the frequency or frequencies generated. The second stage can place these frequencies against the pattern that resulted in that set. This is the base part of building the pattern and frequency table.

The next stage will be incrementing the pattern and creating the outbound signal to stimulate the piezo strips to the next pattern In this example, the feedback circuit 306 can detect frequencies resulting from application of test patterns, and can subsequently input the detectable frequencies into memory, such as done with the example of Table 2.

FIG. 4 illustrates a diagram of a fanned lithe array speaker hardware (FLASH) control circuit 400 that may be part of the control logic 302 shown in FIG. 3 for inputting an electrical signal into a single channel in accordance with embodiments of the present disclosure. Referring to FIG. 4, the control circuit 400 includes a filtering circuit 402, a combining circuit 404, and an envelope driver circuit 406. There may be considered two parts to the circuit 400. One part can be the base circuit that generates a pattern to drive a specific frequency under test. This may be referred to as the "learning table". The other part of the circuit tests the generated signal. The circuit 400 may catalog it and place its value in the learning table that is being filled in. With each step, a pointer can select the next pattern in the learning table which can have a "NULL" in the frequency column because a signal has not yet been collected. Subsequently, the circuit 400 generates a voltage platform based on the incremented pattern from the learning table. The signal generated by this pattern is then cataloged and placed in the Learning Table—if a signal is detected—or it is left as "NULL". Now the pointer can be incremented and the next pattern may be selected from the learning table and used by to drive the next set of voltage pattern. The generating can have connections to multiple piezo strips so that they are working in concert to create a compound wave to generate the "timbre" of the base frequency.

FIG. 5 illustrates a diagram of a control circuit 500 that may be part of the control logic 302 shown in FIG. 3 for inputting electrical signals into multiple channels in accordance with embodiments of the present disclosure. Referring to FIG. 5, the control circuit 500 includes a filtering circuit 502, a combining circuit 504, and an envelope driver circuit 506. The circuit 500 of FIG. 5 is similar to the circuit 400 of FIG. 4 with an exception being that it may be used for testing multiple different arrays (or sets) of electroacoustic transducers (or segments) that are in the same system. In embodiments, the circuit 500 may test one array similar to the description provided for FIG. 4, and subsequently test other arrays in the system in the same way. In another embodiment, alternative to testing arrays entirely separately, combinations of electroacoustic transducers of one or more arrays may be tested simultaneously with electroacoustic transducers of one or more other arrays.

FIG. 6 illustrates a flow diagram of a method for learning audio frequency characteristics of electroacoustic transducers in accordance with embodiments of the present disclosure. It is noted that the method is described by example as being implemented by the system 100 shown in FIG. 1, although it should be appreciated that the method may be implemented by any other suitable system having multiple electroacoustic transducers. Also, it is noted that this method may be applied to scenarios of a system having either a single array of electroacoustic transducers (referred to as "a rib" or "a single rib") or multiple different arrays of electroacoustic transducers (referred to as "ribs" or "multiple ribs").

Referring to FIG. 6, the method includes selecting 600 a first or next pattern in a sequence of patterns. For example, the manager 114 shown in FIG. 1 may select a first pattern or next pattern in a sequence of test patterns to be applied to electroacoustic transducers 104. The first pattern may be applied initially when testing begins. A next pattern refers to the next pattern to be applied in the sequence. Each pattern in the sequence may be applied to the electroacoustic transducers 104.

The method of FIG. 6 includes generating sound based on the selected pattern. Continuing the aforementioned example, the electroacoustic transducers 104 may generate sound in response to each of the patterns applied in step 602. One or more of the electroacoustic transducers 104 may generate sound in response to application of a pattern. The generated sounds may be stored by the manager 114.

The method of FIG. 6 includes recording 604 viable sounds and corresponding patterns. Continuing the aforementioned example, the sounds received by the manager 114 can be compared to a criteria to determine whether they are acceptable. Example acceptance criteria includes, but are not limited to, frequencies within an audible range or other desired range, and frequency volume above a predetermined threshold level. Identification of the frequency and/or amplitude of the sound may be recorded and stored along with the corresponding test pattern in memory 116.

The method of FIG. 6 includes determining 610 whether testing is complete for the current rib. Continuing the aforementioned example, the manager 114 may determine whether testing is complete for all ribs in the system. If that is the case, the method may optimize 612 the pattern table and stop 614. In an example, the same frequency (e.g., 40 Hz) may be recored for multiple patterns (e.g., 020, 100, and 950). In this case, only one of the patterns may be selected for association with the frequency. For example, pattern 020 may be selected, and patterns 100 and 950 may be disabled.

Otherwise, in the case of there being another rib, the manager 114 may proceed to processing 616 of the next rib and return to step 600 for selecting of test patterns for the next rib.

FIG. 7 illustrates a perspective view of a system 700 including electroacoustic transducers 702A, 702B, and 702C that are configured to generate sound and to move with respect to each other in response to application of electrical signals in accordance with embodiments of the present disclosure. Referring to FIG. 7, in an initial phase of use of the system 700 a process or method may be applied to the system 700 for determining the sound-producing characteristics of the electroacoustic transducers 702A, 702B, and 702C. For example, a computing device having an electroacoustic transducer test manager and an acoustoelectric transducer such as the computing device 102 and manager 114 and the acoustoelectric transducer 106 shown in FIG. 1 may be operable connected to the system 700 for determining the sound-producing characteristics. Although only three (3) electroacoustic transducers are shown in FIG. 7, it should be understood that the system 700 may be any suitable number of electroacoustic transducers.

During operation of the system 700, electrical audio signals may be suitable applied to the electroacoustic transducers 702A, 702B, and 702C to cause the electroacoustic transducers 702A, 702B, and 702C to generate sounds. For example, each electroacoustic transducer 702A, 702B, and 702C may include a piezoelectric material that is suitably connected to control circuitry for receipt of an electrical audio signal to cause the corresponding electroacoustic transducer to generate sound. Further, the electroacoustic transducers 702A, 702B, and 702C may be attached to each other by attachment mechanisms 704 to permit movement of the electroacoustic transducers 702A, 702B, and 702C with respect to one another. Particularly, the electroacoustic transducers 702A, 702B, and 702C can have freedom of motion in directions generally indicated by double arrows 704A, 704B, and 704C, respectively. Example piezoelectric materials for the transducers include, but are not limited to, PZT (also known as lead zirconate titanate), barium titanate, and lithium niobate. Other example materials include ceramics and polymers.

FIG. 8 illustrates a perspective view of a system 800 including electroacoustic transducers 802A-802F that are configured to generate sound and to move with respect to each other in response to application of electrical signals in accordance with embodiments of the present disclosure. Referring to FIG. 8, the system 800 is similar to the system 700 shown in FIG. 7 except that the electroacoustic transducers 802A-802F are not just arranged in a single row with respect to one another but also together in another row. The attachment mechanisms 804 permit movement of the electroacoustic transducers 802A-802F with respect to one another and in the directions indicated by double arrows 804.

FIG. 9 illustrates a perspective view of a system 900 including electroacoustic transducers 902A and 902B that are configured to generate sound and to move with respect to each other in response to application of electrical signals in accordance with embodiments of the present disclosure. Referring to FIG. 9, the system 900 includes a computing device 904 that may be similar to or the same as the computing device 102 shown in FIG. 1 for determining sound-producing characteristic of the electroacoustic transducers 902A and 902B and for controlling the electroacoustic transducers 902A and 902B to generate predetermined sounds. The electroacoustic transducers 902A and 902B may be attached to, for example, an acoustic surface that can funcation as a resonator passive amplifier. An example technique for stimulating a piezo element can include providing two electrodes with a space between them. In this example, when flexed, the piezo element can generate voltage. When the electrodes are stimulated with the voltage, the material can flex to drive air in a proportional response to the input voltage. It is noted that although on 2 electroacoustic transducers are shown in FIG. 9, it should be understood that the system may include any suitable number. The computing device 904 may independently input voltage impulses into the electroacoustic transducers 902A and 902B to generate sounds.

FIG. 10 illustrates a perspective view a mobile smartphone 1000 with a system 1002 of electroacoustic transducers integrated therewith for generating sound in accordance with embodiments disclosed herein. Referring to FIG. 10, the smartphone 1000 may include one or more compartments that can contain the system 1102. Further, the smartphone 1000 may include a manager, such as manager 114 shown in FIG. 1, operable to test and control the system 1002 in accordance with embodiments disclosed herein.

FIG. 11 illustrates a diagram of an example structure 1100 of a piezoelectric segment in accordance with embodiments disclosed herein. Referring to FIG. 11, the structure 1100 has resilience, air drivability, and weight. The structure 1100 includes a constraint point 1102 at one end that can allow the other end to freely vibrate in response to activation of the piezoelectric segment.

FIG. 12 illustrates a diagram of an array 1200 of piezoelectric segments in accordance with embodiments disclosed herein. Referring to FIG. 12, the structure 1200 may be referred to as a "spine"-type structure having multiple, hinged sections 1202 that each include piezoelectric material operable in accordance with embodiments of the present disclosure. When suitable voltage is applied, each segment 1202 can push nearby air as depicted by the dotted line 1204 above the segments. The actual push is achieved by a membrane that covers the piezoelectric material. This array 1200 can be utilized to drive air. By either forming a surface by having many adjacent connected together with a tight fit or having the strip placed on an acoustic surface such as a paper tube, polymer surface or a ceramic plate amplification can be provided by vibration.

FIG. 13 illustrates a diagram of an array 1300 of membrane segments 1302 in accordance with embodiments of the present disclosure. The segments 1302 may be connected together by component 1304. The number of segments can depend on the quality level and the portability level desired. The segments 1302 can be connected together by any suitable technique or material, such as by glue or by compressing the strip between layers.

FIG. 14 illustrates a diagram of an array 1400 of membrane segments 1402 in accordance with embodiments of the present disclosure. The segments 1402 may be connected together by component 1404. The number of segments can depend on the quality level and the portability level desired.

FIG. 15 illustrates a diagram of a housing 1500 and an array of membrane segments 1502 in accordance with embodiments of the present disclosure. The housing 1500 may be part of a computing device, such as a smartphone. The segments 1502 may be connected together at their ends by a circular hinge 1504. The array membrane segments may be tapered and connected with the circular hinge 1504 that allows it "fan" open. The fan mode may be one of many including but not limited to: tapered bottom; gated open or cross taper among others.

FIG. 16 illustrates a diagram of two fans 1600 and 1602 of membrane segments in accordance with embodiments of the present disclosure.

FIG. 17 illustrates a diagram of a single fan 1700 of membrane segments in accordance with embodiments of the present disclosure.

FIG. 18 illustrates a diagram of a row 1800 of membrane segments in accordance with embodiments of the present disclosure.

FIG. 19 illustrates a perspective view of a system 1900 of multiple electroacoustic transducers 1902 arranged for distributing sound in a surrounding area in accordance with embodiments of the present disclosure. The arrows indicate that the direction of sound emission in directions substantially along horizontal directions.

FIG. 20 illustrates a perspective view of another system 2000 of multiple electroacoustic transducers 2002 arranged for distributing sound in a surrounding area in accordance with embodiments of the present disclosure. The arrows indicate that the direction of sound emission in directions substantially along horizontal directions.

FIG. 21 illustrates a perspective view of another system 2100 of multiple electroacoustic transducers 2102 arranged for distributing sound in a surrounding area in accordance with embodiments of the present disclosure. The arrows indicate that the direction of sound emission in directions substantially along horizontal directions.

FIG. 22 illustrates a diagram depicting structure 2200 for connecting multiple segments 2202 of piezoelectric material together so they are movable with respect to each other in accordance with embodiments of the present disclosure. Referring to FIG. 22, the segments 2202 may be movable with respect to each other due to their connection together at hinges 2204. Particularly, the hinges 2204 provide a pivot for the adjoined segments 2202 to rotate with respect to each other.

The present subject matter may be a system, a method, and/or a computer program product. The computer program product may include a computer readable storage medium (or media) having computer readable program instructions thereon for causing a processor to carry out aspects of the present subject matter.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a RAM, a ROM, an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network, or Near Field Communication. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present subject matter may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++, Javascript or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present subject matter.

Aspects of the present subject matter are described herein with reference to flowchart illustrations and/or block diagrams of methods, apparatus (systems), and computer program products according to embodiments of the subject matter. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present subject matter. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the embodiments have been described in connection with the various embodiments of the various figures, it is to be understood that other similar embodiments may be used, or modifications and additions may be made to the described embodiment for performing the same function without deviating therefrom. Therefore, the disclosed embodiments should not be limited to any single embodiment, but rather should be construed in breadth and scope in accordance with the appended claims.

What is claimed is:
1. A system comprising:
a plurality of electroacoustic transducers configured to generate sound;
an acoustoelectric transducer configured to convert collective sound produced by the electroacoustic transducers into one or more electrical signals;
a computing device configured to:
apply one or more patterns of electrical signals to the electroacoustic transducers to test for one or more sound-producing characteristics comprising tonal qualities of the sound collectively produced by the electroacoustic transducers;

receive, from the acoustoelectric transducer, electrical signals representative of the collective sound produced by the electroacoustic transducers that resulted from application of the one or more patterns of electrical signals to the electroacoustic transducers;

determine, based on the received electrical signals, the sound-producing characteristics of the electroacoustic transducers attached together by material for use in controlling the electroacoustic transducers to generate one or more predetermined sounds; and associate the sound-producing characteristic of the electroacoustic transducers while attached together by the material with each of the applied one or more patterns of electrical signals.

2. The system of claim 1, wherein the electroacoustic transducers each comprise a piezoelectric material.

3. The system of claim 1, wherein the electroacoustic transducers are spaced apart.

4. The system of claim 1, wherein the electroacoustic transducers are attached together by a material is configured to move in response to sound produced by the electroacoustic transducers for forming a sound-producing component, wherein the received electrical signals are electrical signals are represented by the sound produced by the sound-producing component in response to the application of the one or more patterns of electrical signals to the electroacoustic transducers.

5. The system of claim 1, wherein the electroacoustic transducers are configured to move with respect to each other upon application of electrical signals to the electroacoustic transducers.

6. The system of claim 1, wherein the tonal qualities comprise audio frequency characteristics and/or audio amplitude characteristics.

7. The system of claim 1, wherein the computing device is configured to learn the one or more predetermined sounds that the electroacoustic transducers attached together by the material are operable to generate based on application of the one or more patterns and the resulting electrical signals received from the acoustoelectric transducer.

8. A system comprising:

a plurality of electroacoustic transducers configured to generate sound;

an acoustoelectric transducer configured to convert collective sound produced by the electroacoustic transducers into one or more electrical signals;

a computing device configured to:

apply one or more patterns of electrical signals to the electroacoustic transducers to test for one or more sound-producing characteristics comprising tonal qualities of the sound collectively produced by the electroacoustic transducers;

receive, from the acoustoelectric transducer, electrical signals representative of the collective sound produced by the electroacoustic transducers that resulted from application of the one or more patterns of electrical signals to the electroacoustic transducers;

determine, based on the received electrical signals, the sound-producing characteristics of the electroacoustic transducers attached together by material for use in controlling the electroacoustic transducers to generate one or more predetermined sounds; and associate an audio frequency characteristic and/or an audio amplitude characteristic of the electroacoustic transducers with each of the applied one or more patterns of electrical signals.

9. The system of claim 1, wherein the applied one or more patterns of electrical signals comprise predetermined electrical inputs into the electroacoustic transducers.

10. The system of claim 1, wherein the computing device is configured to map encoded data representing the predetermined sounds to patterns of electrical signals for input into the electroacoustic transducers for producing in the predetermined sounds.

11. The system of claim 10, wherein the computing device is configured to input electrical signals into the electroacoustic transducers to control the electroacoustic transducers to generate the predetermined sounds based on the map while attached together by the material.

12. A method comprising:

applying one or more patterns of electrical signals to a plurality of electroacoustic transducers to test for one or more sound-producing characteristics comprising tonal qualities of the sound collectively produced by the electroacoustic transducers;

receiving electrical signals representative of the collective sound produced by the electroacoustic transducers that resulted from application of the one or more patterns of electrical signals to the electroacoustic transducers;

determining, based on the received electrical signals, the sound-producing characteristics of the electroacoustic transducers for use in controlling the electroacoustic transducers to generate one or more predetermined sounds; and associating the sound-producing characteristic of the electroacoustic transducers while attached together by the material with each of the applied one or more patterns of electrical signals.

13. The method of claim 12, wherein the electroacoustic transducers each comprise a piezoelectric material.

14. The method of claim 12, wherein the electroacoustic transducers are attached together by a material is configured to move in response to sound produced by the electroacoustic transducers for forming a sound-producing component, wherein the received electrical signals are electrical signals represented by the sound produced by the sound-producing component in response to the application of the one or more patterns of electrical signals to the electroacoustic transducers.

15. The method of claim 12, wherein the tonal qualities comprise audio frequency characteristics and/or audio amplitude characteristics.

16. The method of claim 12, further comprising learning the one or more predetermined sounds that the electroacoustic transducers attached together by the material are operable to generate based on application of the one or more patterns and the resulting electrical signals received from the acoustoelectric transducer.

17. The method of claim 12, further comprising associating an audio frequency characteristic and/or an audio amplitude characteristic of the electroacoustic transducers with each of the applied one or more patterns of electrical signals.

18. The method of claim 12, further comprising mapping encoded data representing the predetermined sounds to patterns of electrical signals for input into the electroacoustic transducers for producing in the predetermined sounds.

* * * * *